Dec. 14, 1943.    H. E. GRANTZ    2,336,480
LUBRICATING SYSTEM FOR AIRCRAFT SUPERCHARGERS
Filed Jan. 28, 1942

Inventor:
Howard E. Grantz,
by Harry E. Dunham
His Attorney.

Patented Dec. 14, 1943

2,336,480

UNITED STATES PATENT OFFICE 2,336,480

LUBRICATING SYSTEM FOR AIRCRAFT SUPERCHARGERS

Howard E. Grantz, Swampscott, Mass., assignor to General Electric Company, a corporation of New York Application January 28, 1942, Serial No. 428,587

8 Claims. (Cl. 184—6)

The present invention relates to aircraft superchargers and particularly to arrangements for supplying lubricant thereto.

In connection with aircraft having superchargers driven either from the aircraft engine shaft or by exhaust gases from the aircraft engine or engines, it is customary to lubricate the superchargers with oil taken from a supply tank. This oil supply tank is ordinarily at a level on the aircraft above that of the supercharger and a supply pipe leads from the oil tank down to the supercharger pressure lubricant pump, usually a rotary pump driven from suitable gearing from the supercharger shaft, from which the oil flows to the parts to be lubricated, then to a sump in the supercharger casing. From the sump, the oil is returned by a scavenger pump to the oil tank. The oil tank may be the same oil tank as that used to supply the engine or engines of the aircraft or it may be an oil tank for supplying the supercharger only.

The object of my invention is to provide in connection with a lubricating system of the above type an improved arrangement for automatically shutting off the oil supply from the tank to the pressure pump if either the pipe line leading from the oil tank to the pressure pump or the pipe line leading from the scavenger pump to the supply tank should be ruptured, thus preventing the oil from draining from the tank; also, for automatically shutting off the oil supply line leading from the oil tank to the pressure pump when the supercharger is not running, for example, when the aircraft is on the ground, thus preventing the oil from draining from the tank out through the supercharger.

My invention has especially great utility in a case where the oil for lubricating a supercharger is taken from the supply tank for an aircraft engine, since in this case drainage of the oil from the oil tank might result in failure of the engine.

For a consideration of what I believe to be novel and my invention, attention is directed to the following specification and the claims appended thereto.

Figure 1:
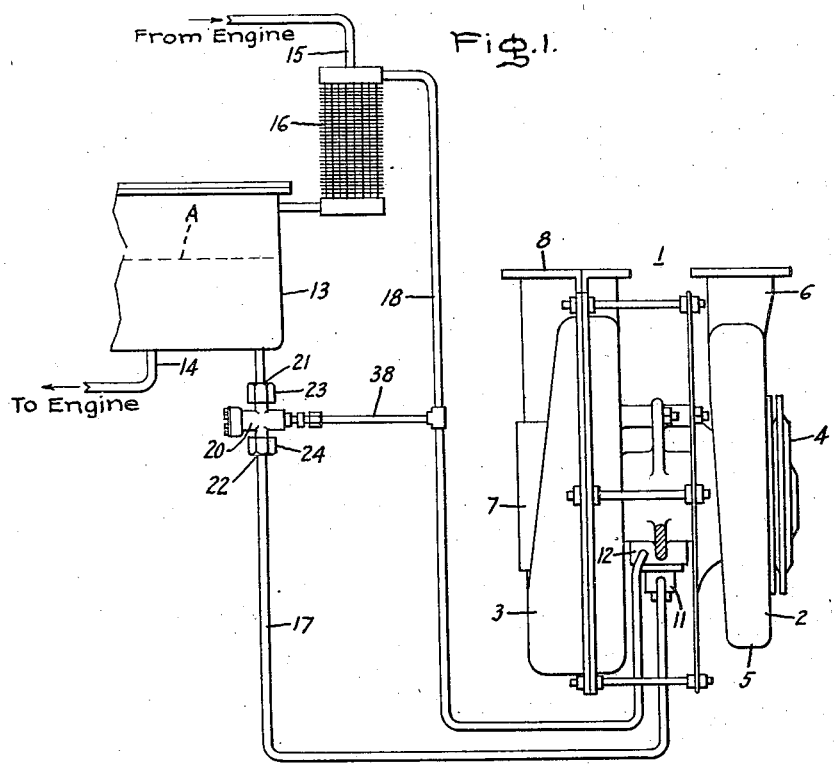
Figure 2:
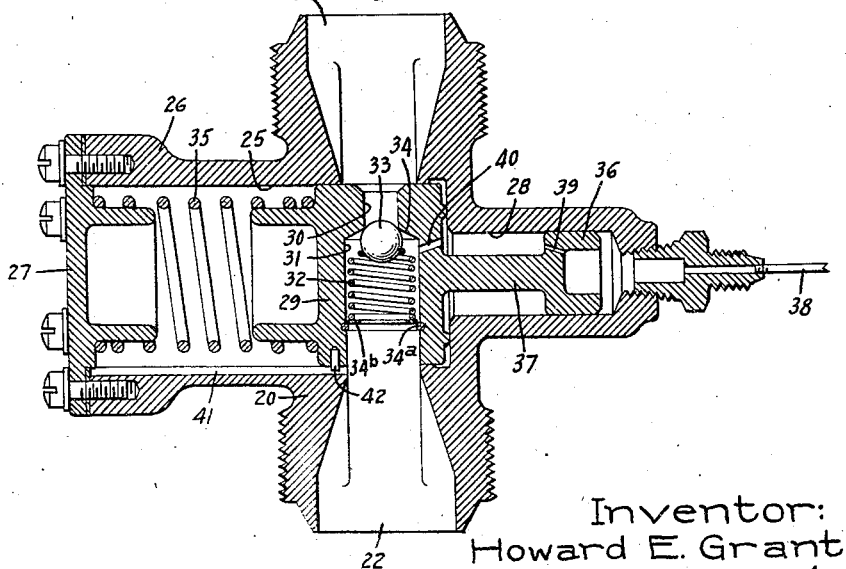

In the drawing, Fig. 1 is a diagrammatic view of a system embodying my invention, and Fig. 2 is a sectional view of a valve which is located in the pipe line between the oil tank and the pressure pump.

Referring to the drawing, 1 indicates an aircraft supercharger, in the present instance a gas driven supercharger comprising a gas turbine 2 and a centrifugal compressor 3. The turbine wheel of the gas turbine is indicated at 4 and the nozzle box which supplies exhaust gas to the turbine wheel is indicated at 5. Exhaust gases from the aircraft engine are supplied to the nozzle box through a conduit 6. The compressor inlet is indicated at 7 and the compressor outlet is indicated at 8. From the compressor outlet, compressed air is led through suitable conduit means to the points of consumption for the air, for example, the intake manifold of an aircraft engine, the aircraft cabin, or both. 11 indicates the pressure lubricant pump and 12 indicates the scavenger pump. The lubricating oil tank is indicated at 13, the dotted line A indicating the level of oil in the tank. As stated, it may be the oil tank which supplies oil to the aircraft engine or engines, or it may be the oil tank for the supercharger alone. In the present instance, it is shown as being the oil tank which supplies lubricant to the aircraft engine or engines, 14 indicating the pipe line leading to the engine or engines, and 15 indicating the return pipe line. In the return pipe line is an oil cooler 16 of suitable construction.

The oil tank is connected to the inlet of the lubricant pressure pump 11 by a pipe line 17. The outlet for the scavenger pump is connected to the oil tank by a pipe line 18 which connects to tank 13 through the oil cooler 16 and is in parallel with the oil return pipe 15 from the engine. The conduits leading from the pressure lubricating pump 11 to the bearings of the supercharger and from the sump to the inlet of the scavenger pump 12 are not shown in the drawing, this being not needed for an understanding of my invention. It will be understood that the pressure lubricant pump pumps oil from tank 13 and discharges it to the bearings of the supercharger; that from the bearings, the oil flows to a sump in the lower portion of the supercharger casing; and that from the sump, it is returned to the oil tank by the scavenger pump.

According to my invention, I provide in pipe line 17 leading from tank 13 to the pressure lubricant pump, a valve structure comprising a valve casing 20 having an inlet opening 21 and a discharge opening 22, it being connected into the pipe line by couplings 23 and 24. In valve casing 20 between the inlet and outlet openings is a cylinder 25 which extends to one side of the valve casing, as indicated at 26, its end being closed by a cylinder head 27. On the side of the valve body opposite cylinder 25 is a second cylinder 28 of smaller diameter than cylinder 25. In the valve casing is a valve body 29 in the form of a piston adapted to slide in cylinder 25. The valve body has a transverse opening 30 which is counter-bored from its lower end to provide an enlarged portion 31 in which is located a spring 32 which biases a ball valve 33 against a seat 34 located at the inner end of counter-bore 31. Spring 32 is held in position in the counter-bore 31 by a snap ring 34ª and a retaining washer 34ᵇ. Located between valve body 29 and cylinder head 27 is a spring 35 which biases valve body 29 to the right hand end of cylinder 25, the right hand end of the cylinder forming a stop to position the valve body. When in this position, valve body 29 and ball valve 33 close the passage from inlet 21 to outlet 22. Formed integral with valve body 29 is a piston 36 which slides in cylinder 28. Piston 36 is connected to valve body 29 by a stem or neck 37. Connected to the end of cylinder 28 is a pipe line 38 which leads to pipe line 18, cylinder 28 being thus connected to the discharge side of scavenger pump 12 whereby the end of piston 36 is subjected to the pressure on the discharge side of the scavenger pump. In piston 36 is a small passage 39 which connects opposite sides of the piston and in valve body 29 is a passage 40 which is somewhat larger than passage 39 and connects cylinder 28 to counter-bore 31 in valve body 29. In cylinder 25 is a groove 41 in which a guide pin 42 carried by valve body 29 runs. This serves to guide movement of the valve body, hold it in correct position in the cylinder and permit leakage of oil from the cylinder past piston 29.

When the supercharger is running, both pumps 11 and 12 being in operation, the pressure of the oil and air being discharged by scavenger pump 12 through pipe line 18 to the oil tank is supplied through pipe line 38 to piston 36, causing the piston to move to the left hand end of cylinder 25 whereby valve body 29 is moved out of line with the opening through the valve so that oil may flow freely through pipe line 17 to the pressure pump 11. In this connection, it is pointed out that the scavenger pump on a supercharger is somewhat larger than the oil pressure pump so that in operation, it pumps oil and also considerable air from the sump to the oil tank. As long as operating conditions are normal, the valve in pipe line 17 will be held open. If, for any reason, the pressure in pipe line 38 should fail or should decrease below a predetermined value due either to pipe line 17 or pipe line 18 being ruptured, or to the shutting down of the supercharger, or for any other reason, the pressure on piston 36 will be relieved, permitting spring 35 to move valve body 29 to closed position, thus shutting off the flow of oil from the oil tank. Should pipe line 17 be ruptured, scavenger pump 12 would quickly remove from the sump such oil as might be at the time there, after which it would then pump only air. The air pressure, by reason of the openings 39 and 40, would be not sufficient to maintain valve body 29 in open position against the action of spring 35. Opening 39 is made small enough so that during normal operation but a very limited amount of oil will flow through it. However, when air only is present, the air will flow through opening 39 readily, thus preventing the building up of air pressure on the piston. Should pipe line 18 or 38 be ruptured, then the pressure on piston 36 is relieved, permitting the valve to close. Also, when the supercharger is shut down, the valve will close, thus preventing oil from tank 13 leaking out through the supercharger pump and casing.

If pipe line 18 or 38 is ruptured, the scavenger pump will continue to pump oil from the sump through the pipe line to the point of rupture as long as the valve in pipe line 17 is open. Under this condition, the scavenger pump discharge pressure would be that required to pump oil through the return line to the point of rupture in the line. Spring 35 is made to have an initial force sufficient to close the valve against such a pressure or against the maximum air pressure which the scavenger pump is capable of producing, whichever is the greater. Spring 35 is designed to hold valve 29 in a closed position against the maximum pressure the scavenging pump can create when pumping air only even if bleeder passage 39 or 40 should become clogged.

Ball valve 33 forms a priming valve which on starting of the supercharger is opened by the suction of the pressure pump so as to initiate flow of oil. If some of the oil drains from return line 18 when the supercharger is shut down, it will have to be replaced before sufficient pressure can be built up to cause the valve in pipe line 17 to open when the supercharger is started up again. Priming valve 33 takes care of this condition. When the supercharger is started up, the pressure pump will draw oil past valve 33 for initial lubricating purposes. Valve body 29 will remain in its closed position until such time as the scavenger pump has built up sufficient pressure in discharge pipe line 18 to move valve body 29 to the left to open the valve. Spring 32 is of such strength that when the aircraft is at lower altitudes, i. e., altitudes of the highest airports, for example, the suction of pressure pump 11 is sufficient to open priming valve 33 while at altitudes above this, it will not do so. Hence, if the return line 18 is ruptured and the valve in line 17 closes, the pressure pump will not be able to open the priming valve as long as the aircraft is at an altitude above that for which spring 32 is designed to hold the priming valve closed.

By placing the safety valve in the pressure pump supply line and then putting such valve under control of the pressure on the discharge side of the scavenger pump, I provide protection for the oil supply in the tank should either pipe line be ruptured, and also protection for the oil in the tank when the supercharger is shut down.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In a lubricating system for aircraft, the combination of a machine on the aircraft having parts to be lubricated, a lubricant supply tank located at a level above the machine, a pressure lubricant pump, a scavenger pump, a pipe line connecting the lubricant supply tank to the inlet of the pressure lubricant pump, a return pipe line connecting the discharge side of the scavenger pump to the lubricant supply tank, and a safety valve in the first-named pipe line controlled by the pressure in the return pipe line.

2. In a lubricating system for aircraft, the combination of a machine on the aircraft having parts to be lubricated, a lubricant supply tank located at a level above the machine, a pressure lubricant pump, a scavenger pump, a pipe line connecting the lubricant supply tank to the inlet of the pressure lubricant pump, a return pipe line connecting the discharge side of the scavenger pump to the lubricant supply tank, a safety valve in the first-named pipe line biased to closed position, and means responsive to the pressure in the return pipe line for normally holding said valve open against said biasing force.

3. In a lubricating system for aircraft, the combination of a machine on the aircraft having parts to be lubricated, a lubricant supply tank located at a level above the machine, a pressure lubricant pump, a scavenger pump, a pipe line connecting the lubricant supply tank to the inlet of the pressure lubricant pump, a return pipe line connecting the discharge side of the scavenger pump to the lubricant supply tank, a valve in the first-named pipe line biased to closed position, a movable abutment connected to the valve to which pressure may be applied to effect opening of the valve, and a pipe line connecting the movable abutment to said return pipe line.

4. In a lubricating system for aircraft, the combination of a machine on the aircraft having parts to be lubricated, a lubricant supply tank located at a level above the machine, a pressure lubricant pump, a scavenger pump, a pipe line connecting the lubricant supply tank to the inlet of the pressure lubricant pump, a return pipe line connecting the discharge side of the scavenger pump to the lubricant supply tank, a valve in the first-named pipe line having a movable valve body, means biasing the movable valve body to closed position, means responsive to the pressure in said return pipe line for holding said valve body in open position, and a priming valve carried by said valve body.

5. In a lubricating system for an aircraft, the combination of a supercharger on the aircraft having parts to be lubricated, a lubricant supply tank located above the level of the supercharger, a pressure lubricant pump and a scavenger pump driven by the supercharger, for circulating lubricant to said parts, a pipe line connecting the supply tank to the inlet of the pressure pump, a return pipe line connecting the discharge side of the scavenger pump to said tank, a valve in said first-named pipe line comprising a movable body, means biasing said movable body to closed position, a movable abutment to which pressure may be applied to hold the movable body in open position, and means connecting said movable abutment to the return pipe line.

6. In a lubricating system for an aircraft, the combination of a supercharger on the aircraft having parts to be lubricated, a lubricant supply tank located above the level of the supercharger, a pressure lubricant pump and a scavenger pump driven by the supercharger, for circulating lubricant to said parts, a pipe line connecting the supply tank to the inlet of the pressure pump, a return pipe line connecting the discharge side of the scavenger pump to said tank, a valve in said first-named pipe line comprising a movable body, means biasing said movable body to closed position, a movable abutment to which pressure may be applied to hold the movable body in open position, means connecting said movable abutment to the return pipe line, and a priming valve carried by said movable body.

7. In a lubricating system for aircraft, the combination of a machine on the aircraft having parts to be lubricated, a lubricant supply tank located at a level above the machine, lubricant pump means, a pipe line connecting the lubricant supply tank to the inlet of the lubricant pump means, a return pipe line connecting the discharge side of the pump means to the lubricant supply tank, and a safety valve in the first named pipe line controlled by the pressure in the return pipe line.

8. In a lubricating system for aircraft, the combination of a machine on the aircraft having parts to be lubricated, a lubricant supply tank located at a level above the machine, lubricant pump means, a pipe line connecting the lubricant supply tank to the inlet of the lubricant pump means, a return pipe connecting the discharge side of the lubricant pump means to the lubricant supply tank, a valve in the first-named pipe line biased to closed position, a movable abutment connected to the valve to which pressure may be supplied to effect opening of the valve, and a pipe line connecting the movable abutment to said return pipe line.

HOWARD E. GRANTZ.